US011188399B2

(12) United States Patent
Yamaura

(10) Patent No.: US 11,188,399 B2
(45) Date of Patent: Nov. 30, 2021

(54) DETERMINING WHETHER TO SUPPRESS AN INTERRUPT INDICATING COMPLETION OF PROCESSING OF A FRAME BASED ON PRIORITY OF THE FRAME AND CURRENT VALUE INFORMATION

(71) Applicant: Kabushiki Kaisha Toshiba, Minato-ku (JP)

(72) Inventor: Takahiro Yamaura, Kawasaki (JP)

(73) Assignee: Kabushiki Kaisha Toshiba, Minato-ku (JP)

(*) Notice: Subject to any disclaimer, the term of this patent is extended or adjusted under 35 U.S.C. 154(b) by 121 days.

(21) Appl. No.: 15/911,337

(22) Filed: Mar. 5, 2018

(65) Prior Publication Data
US 2019/0087245 A1 Mar. 21, 2019

(30) Foreign Application Priority Data
Sep. 15, 2017 (JP) .............................. JP2017-177977

(51) Int. Cl.
G06F 9/54 (2006.01)
G06F 9/455 (2018.01)
(Continued)

(52) U.S. Cl.
CPC .......... *G06F 9/546* (2013.01); *G06F 9/45558* (2013.01); *G06F 13/00* (2013.01);
(Continued)

(58) Field of Classification Search
CPC .......... G06F 13/00; G06F 2009/45595; G06F 9/45558; G06F 9/546
See application file for complete search history.

(56) References Cited

U.S. PATENT DOCUMENTS 4,570,257 A * 2/1986 Olson ................... G06F 13/372
370/216
6,467,008 B1 * 10/2002 Gentry, Jr. .......... H04L 47/6225
710/261
(Continued)

FOREIGN PATENT DOCUMENTS

JP 2000-330806 11/2000
JP 2002-73351 3/2002
(Continued)

OTHER PUBLICATIONS

A. Vishnu, et al., "Hot-Spot Avoidance With Multi-Pathing Over InfiniBand: An MPI Perspective", Seventh IEEE International Symposium on Cluster Computing and the grid(CCGrid'07), IEEE Computer Society, May 1, 2007, 8 pages.

*Primary Examiner* — Jorge A Chu Joy-Davila
(74) *Attorney, Agent, or Firm* — Oblon, McClelland, Maier & Neustadt, L.L.P.

(57) ABSTRACT

According to an embodiment, a notification control device includes a memory and one or more hardware processors configured to function as a determination unit and a notification unit. The determination unit is configured to determine, using notification control information set according to a priority of a frame, whether to notify of completion notification indicating completion of processing of the frame. The notification unit is configured to notify the completion notification when it is determined to notify of the completion notification.

11 Claims, 17 Drawing Sheets

(51) Int. Cl.
*H04L 12/851* (2013.01)
*H04L 12/841* (2013.01)
*H04L 12/875* (2013.01)
*G06F 13/00* (2006.01)
*H04L 12/879* (2013.01)

(52) U.S. Cl.
CPC .......... *H04L 47/2441* (2013.01); *H04L 47/28* (2013.01); *H04L 47/564* (2013.01); *G06F 2009/45595* (2013.01); *H04L 49/901* (2013.01)

(56) References Cited

U.S. PATENT DOCUMENTS

| | | | |
|---|---|---|---|
| 6,615,303 B1 | 9/2003 | Endo et al. | |
| 7,319,669 B1* | 1/2008 | Kunz | H04L 47/36 370/235 |
| 7,356,817 B1* | 4/2008 | Cota-Robles | G06F 9/45537 710/262 |
| 8,788,591 B2* | 7/2014 | Jiang | G06F 9/546 709/206 |
| 9,176,770 B2 | 11/2015 | Dong et al. | |
| 10,191,865 B1* | 1/2019 | Machulsky | G06F 9/45558 |
| 2002/0087723 A1* | 7/2002 | Williams | H04L 47/12 709/240 |
| 2002/0188749 A1* | 12/2002 | Gaur | H04L 43/0894 709/234 |
| 2003/0097511 A1* | 5/2003 | Choi | H04L 12/4015 710/305 |
| 2007/0217378 A1* | 9/2007 | Moorti | H04L 1/1829 370/338 |
| 2009/0190652 A1* | 7/2009 | Kim | H04L 29/06027 375/240.01 |
| 2014/0095752 A1* | 4/2014 | Cheshire | G06F 13/24 710/262 |
| 2016/0360442 A1 | 12/2016 | Stacey et al. | |
| 2018/0365160 A1* | 12/2018 | Jiang | G06F 12/109 |
| 2019/0026170 A1* | 1/2019 | Vaccaro | G06Q 40/04 |

FOREIGN PATENT DOCUMENTS

| | | |
|---|---|---|
| JP | 2002-185516 A | 6/2002 |
| JP | 2002-354030 A | 12/2002 |
| JP | 2007-88709 A | 4/2007 |
| WO | WO 2013/145199 A1 | 10/2013 |

* cited by examiner

FIG.6

| TRANSFER IDENTIFICATION INFORMATION | VIRTUAL MACHINE IDENTIFICATION INFORMATION | NETWORK INTERFACE IDENTIFICATION INFORMATION | TRAFFIC CLASS INFORMATION | PRESENTATION TIME INFORMATION |

FIG.7A

| TRANSMISSION SOURCE VIRTUAL MACHINE | NETWORK INTERFACE | TRAFFIC CLASS | NOTIFICATION SUPPRESSION VALUE | | CURRENT VALUE | | |
|---|---|---|---|---|---|---|---|
| | | | NUMBER OF FRAMES TO AGGREGATE | TIMER VALUE (ns) | NOTIFICATION SUPPRESSION STATE | NUMBER OF REMAINING FRAMES | REMAINING TIMER VALUE |
| FIRST VIRTUAL MACHINE | #0 | #0 | 0 | 10000000 | 1 | 0 | 6000000 |
| | | #1 | 8 | 8000000 | 1 | 3 | 40000 |
| | | #2 | 4 | 7000000 | 1 | 1 | 2000000 |
| | | #3 | 4 | 6000000 | 1 | 2 | 2000000 |
| | | #4 | 4 | 5000000 | 0 | 0 | 0 |
| | | #5 | 4 | 2000000 | 1 | 0 | 0 |
| | | #6 | 4 | 100000 | 1 | 0 | 50000 |
| | | #7 | 1 | 0 | 0 | 0 | 0 |
| SECOND VIRTUAL MACHINE | #0 | #0 | 16 | 2000000 | 1 | 11 | 300000 |
| | | #1 | 8 | 8000000 | 1 | 3 | 40000 |
| | | #2 | 4 | 7000000 | 1 | 1 | 2000000 |
| | | #3 | 4 | 6000000 | 1 | 2 | 2000000 |
| | | #4 | 4 | 5000000 | 0 | 0 | 0 |
| | | #5 | 4 | 2000000 | 1 | 0 | 0 |
| | | #6 | 4 | 100000 | 1 | 0 | 50000 |
| | | #7 | 1 | 0 | 0 | 0 | 0 |
| THIRD VIRTUAL MACHINE | #0 | #0 | 8 | 10000000 | 1 | 0 | 5000000 |
| | | #1 | 4 | 8000000 | 0 | 0 | 0 |
| | | #2 | 4 | 7000000 | 1 | 1 | 2000000 |
| | | #3 | 4 | 6000000 | 1 | 2 | 2000000 |
| | | #4 | 4 | 5000000 | 0 | 0 | 0 |
| | | #5 | 4 | 2000000 | 0 | 0 | 0 |
| | | #6 | 4 | 100000 | 0 | 0 | 50000 |
| | | #7 | 1 | 0 | 0 | 0 | 0 |

FIG.7B

| TRANSMISSION DESTINATION VIRTUAL MACHINE | NETWORK INTERFACE | TRAFFIC CLASS | NOTIFICATION SUPPRESSION VALUE | | CURRENT VALUE | | |
|---|---|---|---|---|---|---|---|
| | | | NUMBER OF FRAMES TO AGGREGATE | TIMER VALUE (ns) | NOTIFICATION SUPPRESSION STATE | NUMBER OF REMAINING FRAMES | REMAINING TIMER VALUE (ns) |
| FIRST VIRTUAL MACHINE | #0 (AA-AA-AA-AA-AA-AA) | #0 | 0 | 10000000 | 1 | 0 | 6000000 |
| | | #1 | 8 | 8000000 | 1 | 3 | 40000 |
| | | #2 | 2 | 7000000 | 1 | 1 | 2000000 |
| | | #3 | 2 | 6000000 | 1 | 2 | 2000000 |
| | | #4 | 2 | 5000000 | 0 | 0 | 0 |
| | | #5 | 2 | 2000000 | 0 | 0 | 0 |
| | | #6 | 2 | 100000 | 1 | 0 | 50000 |
| | | #7 | 1 | 0 | 0 | 0 | 0 |
| SECOND VIRTUAL MACHINE | #0 (BB-BB-BB-BB-BB-BB) | #0 | 16 | 2000000 | 1 | 11 | 300000 |
| | | #1 | 8 | 8000000 | 1 | 3 | 40000 |
| | | #2 | 2 | 7000000 | 1 | 1 | 2000000 |
| | | #3 | 2 | 6000000 | 1 | 2 | 2000000 |
| | | #4 | 2 | 5000000 | 0 | 0 | 0 |
| | | #5 | 2 | 2000000 | 1 | 0 | 50000 |
| | | #6 | 2 | 100000 | 0 | 0 | 0 |
| | | #7 | 1 | 0 | 0 | 0 | 0 |
| THIRD VIRTUAL MACHINE | #0 (CC-CC-CC-CC-CC-CC) | #0 | 8 | 10000000 | 1 | 0 | 5000000 |
| | | #1 | 2 | 8000000 | 0 | 0 | 0 |
| | | #2 | 2 | 7000000 | 1 | 1 | 2000000 |
| | | #3 | 2 | 6000000 | 1 | 2 | 2000000 |
| | | #4 | 2 | 5000000 | 0 | 0 | 0 |
| | | #5 | 2 | 2000000 | 1 | 0 | 50000 |
| | | #6 | 2 | 100000 | 0 | 0 | 0 |
| | | #7 | 1 | 0 | 0 | 0 | 0 |

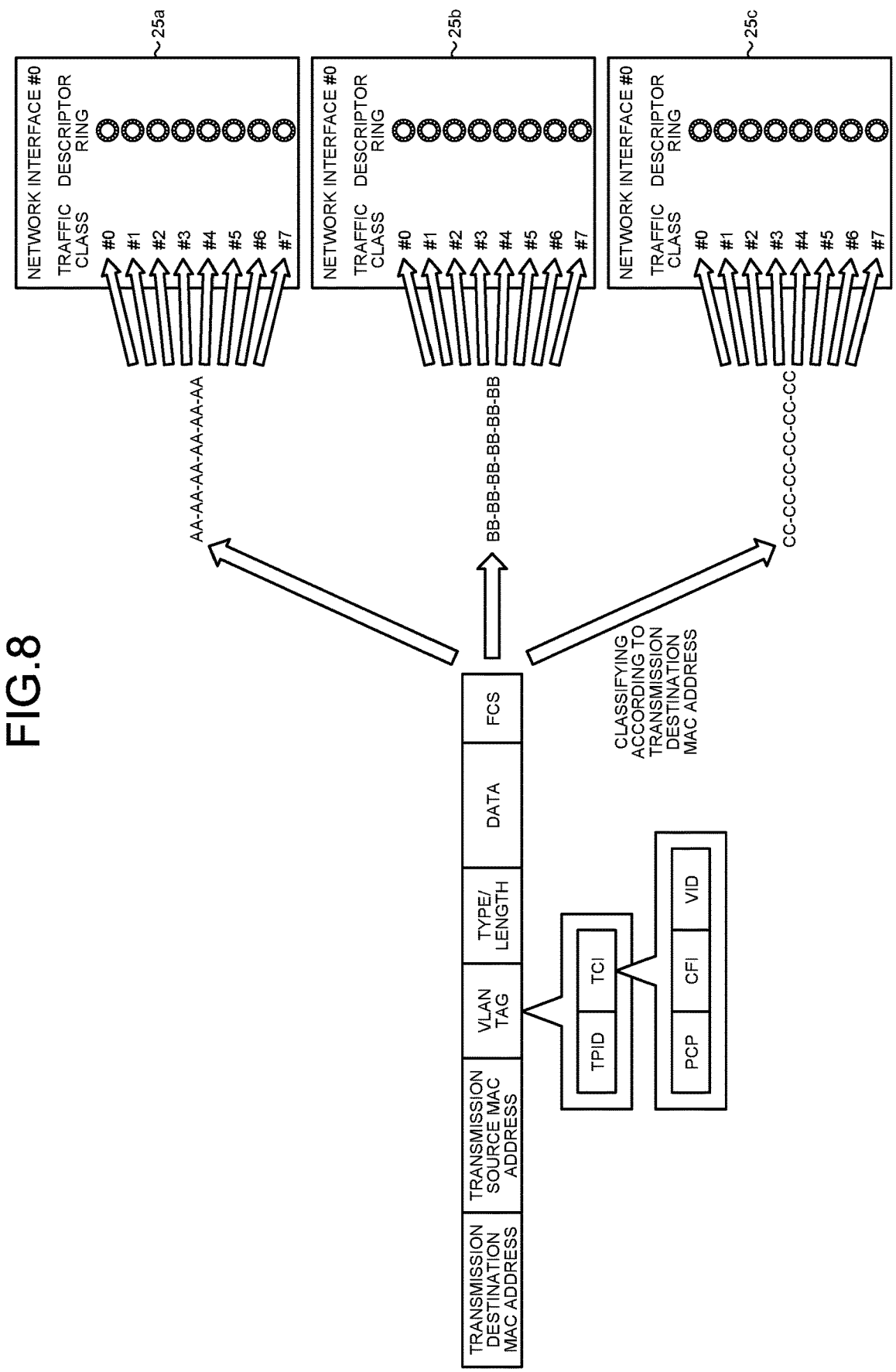

FIG.9

| PRIORITY (PCP) | 0 | 1 | 2 | 3 | 4 | 5 | 6 | 7 |
|---|---|---|---|---|---|---|---|---|
| TRAFFIC CLASS | 1 | 0 | 6 | 7 | 2 | 3 | 4 | 5 |

DETERMINING WHETHER TO SUPPRESS AN INTERRUPT INDICATING COMPLETION OF PROCESSING OF A FRAME BASED ON PRIORITY OF THE FRAME AND CURRENT VALUE INFORMATION

CROSS-REFERENCE TO RELATED APPLICATIONS

This application is based upon and claims the benefit of priority from Japanese Patent Application No. 2017-177977, filed on Sep. 15, 2017; the entire contents of which are incorporated herein by reference.

FIELD

Embodiments described herein relate generally to a notification control device, a notification control method, and a computer program product.

BACKGROUND

Communication devices that perform real-time communication via a network compliant with the time-sensitive networking (TSN) standard or the like have been conventionally known. In addition, for example, a technique in which a host processor of a communication device operates a plurality of virtual machines, and the respective virtual machines perform communication via a network has been conventionally known.

BRIEF DESCRIPTION OF THE DRAWINGS

FIG. 6 is a view illustrating an example of frame transmission/reception information according to the first embodiment;

FIG. 7A is a view illustrating an example of notification control information for transmission according to the first embodiment;

FIG. 7B is a view illustrating an example of notification control information for reception according to the first embodiment;

FIG. 8 is a view for describing an example of classifying processing according to the first embodiment;

FIG. 9 is a view illustrating an example of a traffic class table according to the first embodiment;

DETAILED DESCRIPTION

According to an embodiment, a notification control device includes a memory and one or more hardware processors configured to function as a determination unit and a notification unit. The determination unit is configured to determine, using notification control information set according to a priority of a frame, whether to notify of completion notification indicating completion of processing of the frame. The notification unit is configured to notify the completion notification when it is determined to notify of the completion notification.

Embodiments will be described in detail below with reference to the accompanying drawings.

First Embodiment

First of all, a first embodiment will be described.

Example of Hardware Configuration

Figure 1:
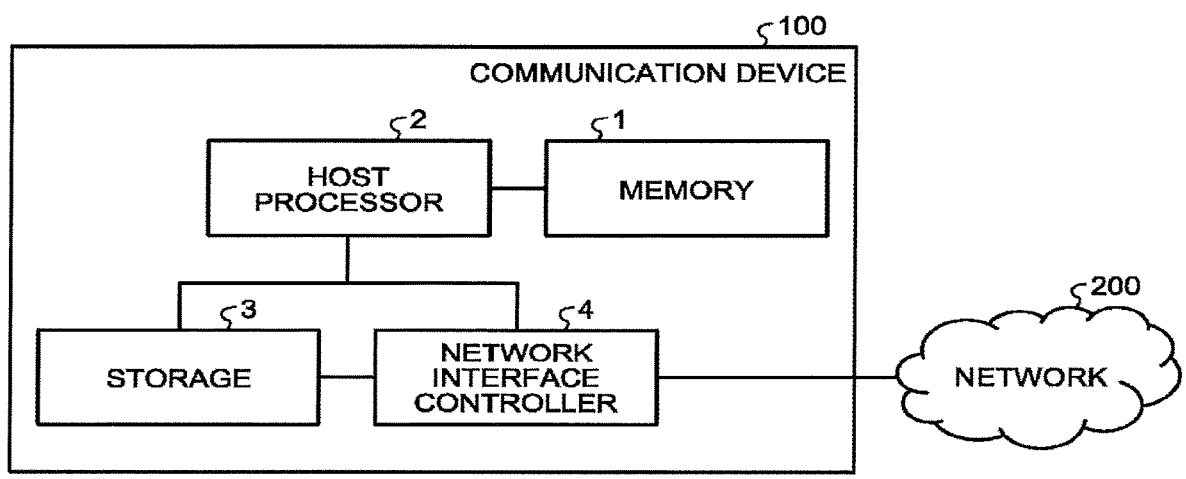
FIG. 1 is a diagram illustrating an example of a hardware configuration of a communication device according to a first embodiment.

FIG. 1 is a diagram illustrating an example of a hardware configuration of a communication device 100 according to the first embodiment. The communication device 100 according to the first embodiment includes a memory 1, a host processor 2, storage 3, and a network interface controller 4.

The memory 1 is connected to the host processor 2 via a memory controller inside the host processor 2. The memory 1 is implemented by, for example, a dynamic random access memory (DRAM) or the like.

The host processor 2 is connected to the storage 3 by using a bus such as PCI Express (registered trademark). Similarly, the host processor 2 is connected to the network interface controller 4 by using a bus such as PCI Express (registered trademark).

The host processor 2 loads an image of an execution program stored in the storage 3 on the memory 1 and executes processing while reading a command and data on the memory 1. The processing is executed by one or a plurality of cores provided in the host processor 2. In addition, the host processor 2 has a hardware virtualization support function and can efficiently execute a virtual machine using a virtualization correspondence command set and an input/output memory management unit (IOMMU), or the like.

The storage 3 is implemented by, for example, a hard disk drive (HDD) and a solid state drive (SSD).

The network interface controller 4 connects the host processor 2 to a network 200.

The network 200 is, for example, Ethernet (registered trademark). The network 200 is a network compliant with audio video bridging (AVB) defined by IEEE 802.1, the TSN standard, and the like. An arbitrary type of the network 200 may be used. The network 200 is, for example, an office network, a network inside a data center, an in-vehicle network, a network inside a factory, a network of a mobile base station, and the like.

The network interface controller 4 is implemented by, for example, an application specific integrated circuit (ASIC), a field-programmable gate array (FPGA), and the like. In addition, the network interface controller 4 may be implemented by a combination of the ASIC, the FPGA, and a general-purpose processor. In addition, the network interface controller 4 may be mounted as a separate chip from the host processor 2, or may be implemented as a single chip as a system-on-a-chip (SoC).

Example of Functional Configuration

Figure 2:
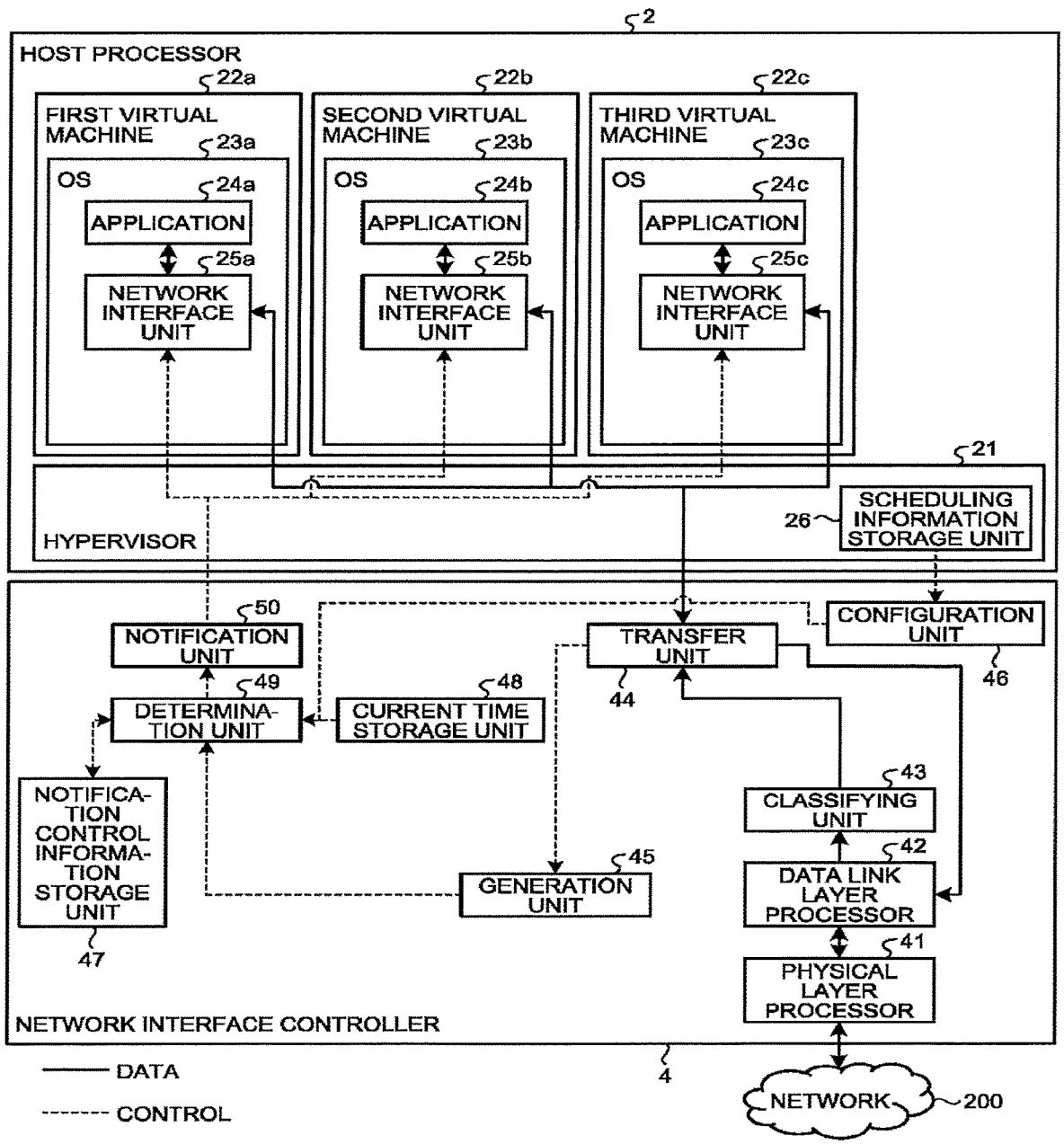
FIG. 2 is a diagram illustrating an example of a functional configuration of a main part of the communication device according to the first embodiment.

FIG. 2 is a diagram illustrating an example of a functional configuration of a main part of the communication device 100 according to the first embodiment. Functions of the main part of the communication device 100 according to the first embodiment are implemented by the host processor 2 (including functions implemented by the memory 1) and the network interface controller 4 described above.

The host processor 2 includes a hypervisor 21, a first virtual machine 22a, a second virtual machine 22b, a third virtual machine 22c, operating systems (OSs) 23a to 23c, applications 24a to 24c, network interface units 25a to 25c, and scheduling information storage unit 26.

Hereinafter, the first virtual machine 22a, the second virtual machine 22b, and the third virtual machine 22c will be simply referred to as virtual machines 22 when not distinguished from each other. Similarly, the OSs 23a to 23c will be simply referred to as OSs 23 when not distinguished from each other. Similarly, the applications 24a to 24c will be simply referred to as applications 24 when not distinguished from each other. Similarly, the network interface units 25a to 25c will be simply referred to as network interface units 25 when not distinguished from each other.

The hypervisor 21 controls operations of the first virtual machine 22a, the second virtual machine 22b, and the third virtual machine 22c. The number of the virtual machines 22 controlled by the hypervisor 21 may be arbitrary.

The OS 23 operates in each of the virtual machines 22. The OS 23 is, for example, a real-time OS and a general-purpose OS. Incidentally, types of OSs operating in the respective virtual machines 22 are not necessarily the same, and a different OS may be operated for each of the virtual machines 22.

The application 24 operates on each of the OSs 23. Although the single application 24 operating on each of the OSs 23 is illustrated in the example of FIG. 2 for simplification, a plurality of the applications 24 operating on the respective OSs 23 may be used. The application 24 is formed of tasks. An execution time (for example, an execution period and a maximum execution time) for each task is assigned in the application 24 for which a real-time property is required. Each of the OSs 23 schedules the execution time of each task so as not to exceed a deadline of each task. In addition, the hypervisor 21 is configured to schedule an execution time of each of the virtual machines 22 so as not to exceed the deadline of each task operating in each of the virtual machines 22.

The network interface unit 25 performs communication control of data to be transmitted and received between the application 24 operating in the virtual machine 22 and the network 200. The network interface unit 25 is implemented by, for example, a function of a device driver that controls the network interface controller 4. In addition, the network interface unit 25 operates, for example, by being triggered by notification received from the network interface controller 4. Details of the network interface unit 25 will be described later with reference to FIG. 4.

The scheduling information storage unit 26 stores scheduling information. The scheduling information indicates a schedule of execution times classified to each of the virtual machines 22. For example, the scheduling information storage unit 26 is implemented by the memory 1 connected to the host processor 2.

Figure 3:
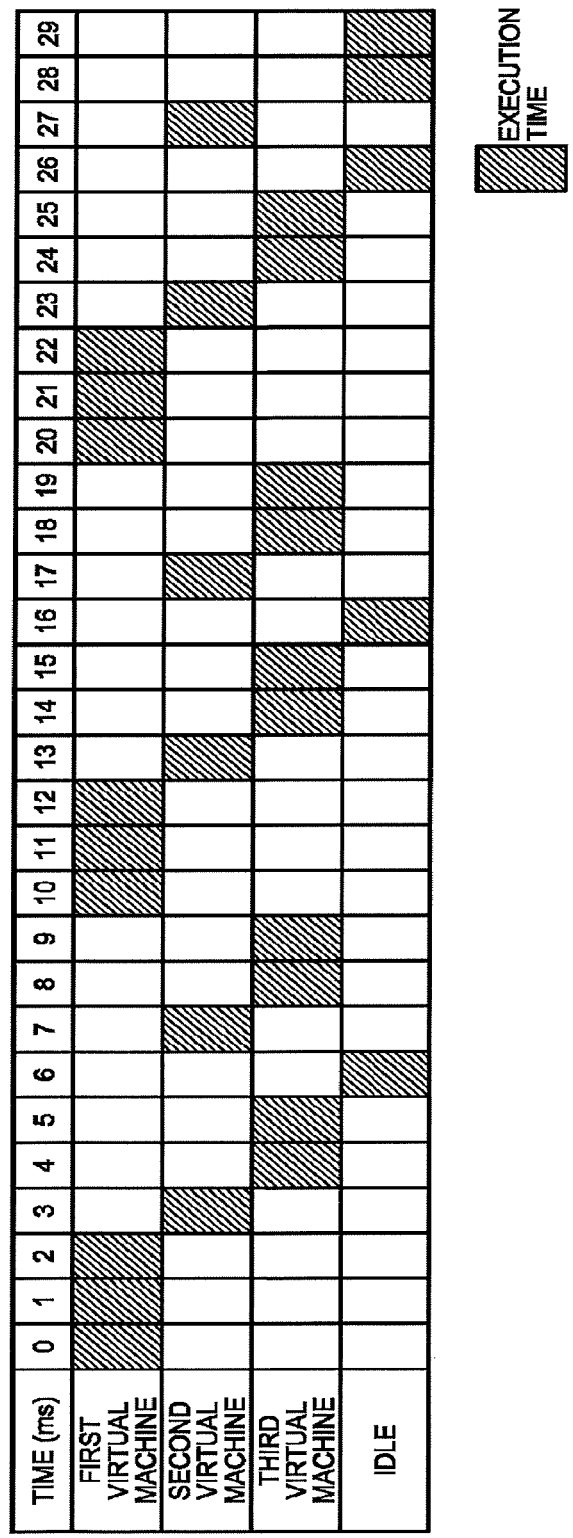
FIG. 3 is a view illustrating an example scheduling information according to the first embodiment.

FIG. 3 is a view illustrating an example of the scheduling information according to the first embodiment. The example of FIG. 3 illustrates that execution times are classified to the first virtual machine 22a, for example, at time 0 to 2 (ms). The hypervisor 21 schedules the execution time of each of the virtual machines 22 using this scheduling information.

Next, the function of the network interface controller 4 will be described returning to FIG. 2.

The network interface controller 4 is connected to the host processor 2 via the bus such as PCI Express (registered trademark). The network interface controller 4 executes transmission/reception processing of a frame via the network 200 following an instruction from the host processor 2. The frame is, for example, an Ethernet (registered trademark) frame.

The network interface controller 4 corresponds to a single root I/O virtualization (SR-IOV). Each of the virtual machines 22 can directly access the network interface controller 4 by a function of PCI Passthrough.

The network interface controller 4 includes a physical layer processor 41, a data link layer processor 42, an classifying unit 43, a transfer unit 44, a generation unit 45, a configuration unit 46, a notification control information storage unit 47, a current time storage unit 48, a determination unit 49, and a notification unit 50. The determination unit 49 and the notification unit 50 operate as a notification control device.

The physical layer processor 41 is connected to the network 200 and executes transmission/reception processing relating to a physical layer.

The data link layer processor 42 executes transmission/reception processing relating to a data link layer.

When receiving frames from the data link layer processor 42, the classifying unit 43 classifies the frames. An example of classifying processing performed by the classifying unit 43 will be described later with reference to FIG. 8.

The transfer unit 44 transfers the frame.

The generation unit 45 generates frame transmission/reception information based on information on the frame transferred by the transfer unit 44. Details of the frame transmission/reception information will be described later with reference to FIG. 6.

The configuration unit 46 performs setting to share the above-described scheduling information.

The notification control information storage unit 47 stores notification control information determined according to a priority of a frame. Details of the notification control information will be described later with reference to FIGS. 7A and 7B.

The current time storage unit 48 stores current time. For example, it is assumed that the current time is synchronized by time synchronization technology defined by IEEE 802.1AS, IEEE 1588, or the like.

The determination unit 49 determines whether to notify of completion notification indicating completion of processing of a frame by using the above-described notification control information. The processing of a frame is, for example, at least one of transmission processing and reception processing of a frame. Details of the processing of the determination unit 49 will be described later with reference to a flowchart of FIG. 10.

When notifying of the above-described completion notification, the notification unit 50 notifies the network interface unit 25 in each of the virtual machines 22 of the completion notification.

Figure 4:
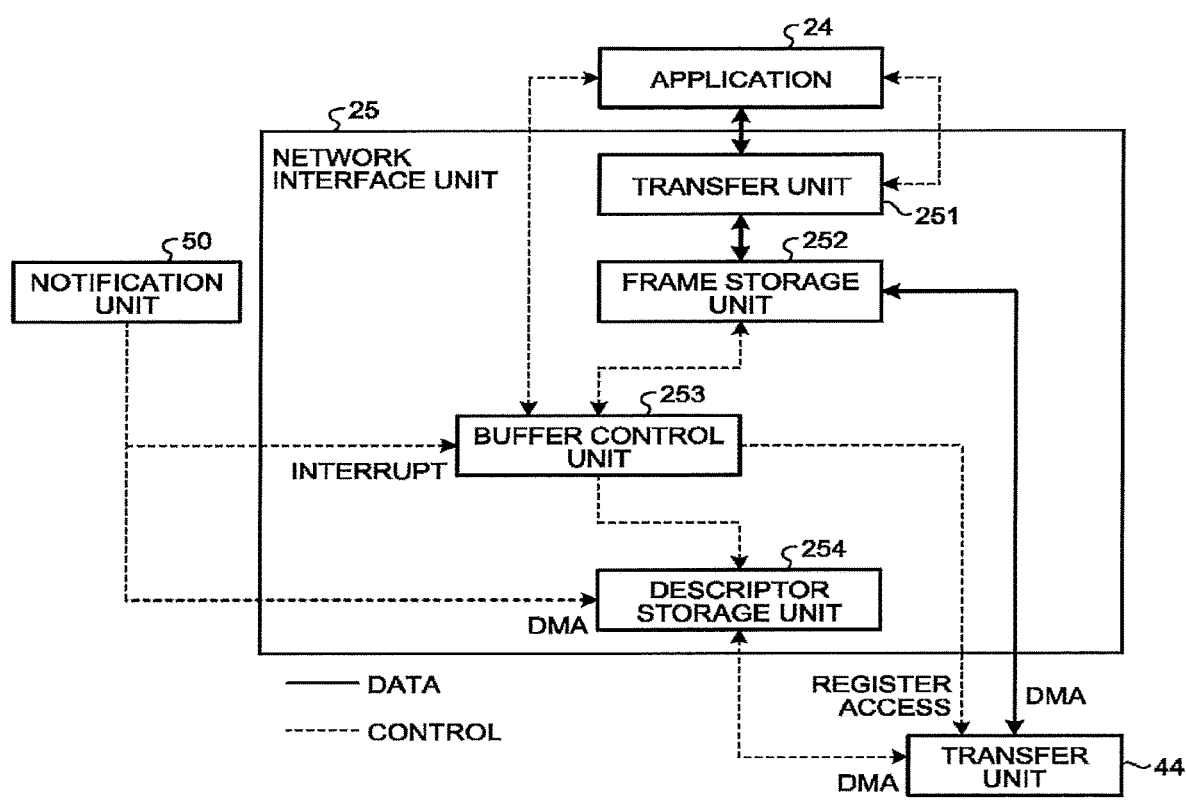
FIG. 4 is a diagram illustrating an example of a functional configuration of a network interface unit according to the first embodiment.

FIG. 4 is a diagram illustrating an example of a functional configuration of the network interface unit 25 according to the first embodiment. The network interface unit 25 according to the first embodiment includes a transfer unit 251, a frame storage unit 252, a buffer control unit 253, and a descriptor storage unit 254.

The transfer unit 251 transfers data (a frame) between the application 24 and the frame storage unit 252.

The frame storage unit 252 stores the frame to be transmitted to and received from the network interface controller 4 (the transfer unit 44).

The buffer control unit 25 performs storage control of a storage area of the frame storage unit 252.

The descriptor storage unit 254 stores a descriptor ring configured to perform transfer control of a frame between the buffer control unit 253 and the network interface controller 4 (the transfer unit 44 and the notification unit 50).

Figure 5A:
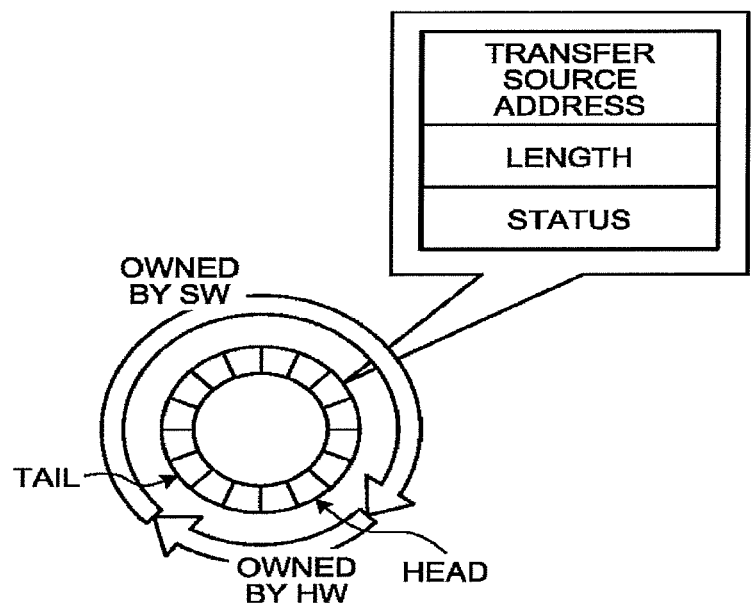
FIG. 5A is a view for describing a descriptor ring for transmission according to the first embodiment.
Figure 5B:
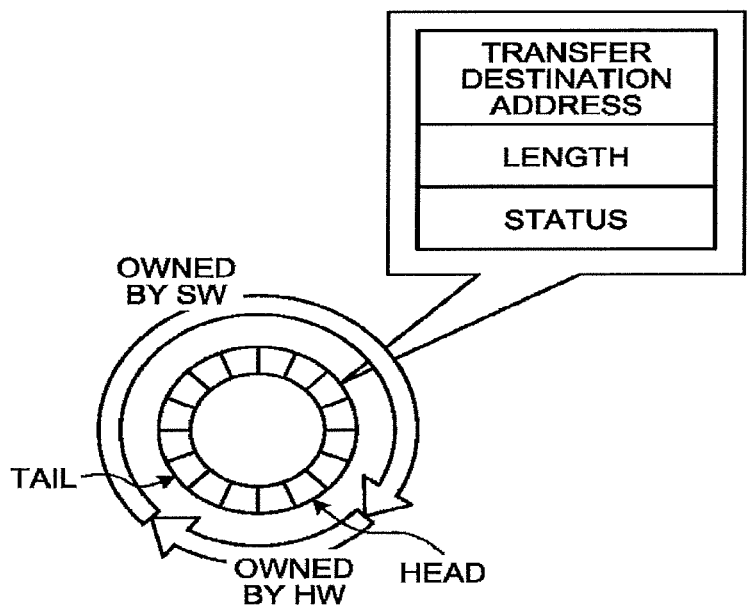
FIG. 5B is a view for describing a descriptor ring for reception according to the first embodiment.

FIG. 5A is a view for describing the descriptor ring for transmission according to the first embodiment. FIG. 5B is a view for describing the descriptor ring for reception according to the first embodiment.

FIG. 5A illustrates an example of a configuration of the descriptor ring for transmission stored in the descriptor storage unit 254. FIG. 5B illustrates an example of a configuration of the descriptor ring for reception stored in the descriptor storage unit 254. The descriptor ring is configured using a ring buffer, and one entry is called a descriptor.

The descriptor ring is stored in the memory 1 connected to the host processor 2. The descriptor ring is accessed by direct memory access (DMA) from the network interface controller 4.

The descriptor ring is managed by two variables including Head and Tail. As illustrated in FIGS. 5A and 5B, a descriptor from Head to Tail-1 indicates a descriptor owned by hardware (HW), that is, the network interface controller 4. In addition, the descriptor from Tail to Head-1 indicates a descriptor owned by software (SW), that is, software (the network interface unit 25) operating on the host processor 2.

Information included in the descriptor differs between a case where transfer processing is the transmission processing and a case where transfer processing is the reception processing.

A transmission descriptor includes a transfer source address, a length, and a status. The transfer source address indicates a head address indicating a head position of a storage area (a storage area on the memory 1) of the frame storage unit 252 in which a frame to be transmitted is stored. The length indicates a length of the frame to be transmitted. Information indicating a state of the transmission processing is stored in the status.

A reception descriptor includes a transfer destination address, a length, and a status. The transfer destination address indicates a head address indicating a head position of a storage area (a storage area on the memory 1) of the frame storage unit 252 in which a frame to be received is stored. The length indicates a length of the frame to be received. Information indicating a state of the reception processing is stored in the status.

The above-described status includes, for example, an error bit, a DONE bit, and the like. The error bit indicates presence or absence of a transfer error. The DONE bit indicates that processing is ended in the network interface controller 4. When the DONE bit of the transmission descriptor is 1, it indicates that the transmission processing is ended, and a case where the DONE bit of the reception descriptor is one indicates that the reception processing is ended. The network interface controller 4 writes one to each bit. (the error bit and the DONE bit). Further, the network interface unit 25 (the buffer control unit 253) clears each bit by writing zero to each bit after confirming each bit.

Since operations of the network interface unit 25 are different between the transmission processing and the reception processing, the respective operations will be described below.

Example of Transmission Processing

Returning to FIG. 4, the transfer unit 251 first receives a transmission instruction from the application 24. The transmission instruction includes a head address of data to be transmitted stored in a buffer of the application 24, a length of the data to be transmitted, and a traffic class used for transmission. The traffic class is used for transmission control of a frame, for example. The traffic class indicates eight values of zero to seven, for example.

Next, the buffer control unit 253 allocates a buffer area to store a frame including the data to be transmitted in the frame storage unit 252. Next, the transfer unit 251 copies data stored in the buffer of the application 24 to the buffer area allocated in the frame storage unit 252.

Next, the buffer control unit 253 sets a transfer source address, a length, and a status included in a descriptor (entry) indicated by Tail of the descriptor ring of the descriptor storage unit 251.

A head address of the buffer area in which the frame is stored is set to the transfer source address. A length of the frame is set to the length. Zero is set as an error bit and a DONE bit included in the status.

Here, the descriptor ring differs not only for each network interface of the virtual machine 22 but also for each traffic class. More specifically, which traffic class of which network interface of the virtual machine 22 uses which descriptor ring is determined in advance by initial setting.

Next, the buffer control unit 253 transmits values of Tail and Head of each descriptor ring to the transfer unit 44 of the network interface controller 4. Specifically, the buffer control unit 253 updates a register interface that can be referred to by the transfer unit 44 of the network interface controller 4. Here, the buffer control unit 253 updates the value of Tail of the corresponding descriptor ring stored in the register interface provided for the host processor with a value obtained by adding one.

Returning to FIG. 2, the transfer unit 44 of the network interface controller 4 detects that a descriptor of Tail-1 of the descriptor ring has been updated based on the increment of the value of Tail by one. The transfer unit 44 acquires a transfer source address and a length of a frame from the updated descriptor by DMA. Next, the transfer unit 44 transfers the frame designated by the transfer source address and the length from the frame storage unit 252 to the data link layer processor 42 by DMA.

Next, the data link layer processor 42 performs assignment of PCP of a VLAN tag according to a traffic class, traffic shaping of TSN, and the like. Further, the data link layer processor 42 calculates a checksum of a frame and adds the checksum to the frame. The correspondence between the traffic class and the PCP is obtained using a traffic class table (FIG. 9) to be described later.

Next, the physical layer processor 41 transmits a frame to the network 200.

When the frame is transferred by the transfer unit 44, the generation unit 45 receives control information of the transfer processing from the transfer unit 44. When receiving the control information from the transfer unit 44, the generation unit 45 generates the frame transmission/reception information based on the control information. Further, the generation unit 45 inputs the frame transmission/reception information to the determination unit 49.

FIG. 6 is a view illustrating an example of the frame transmission/reception information according to the first embodiment. The notification control information according to the first embodiment includes transfer identification information, virtual machine identification information, network interface identification information, traffic class information, and presentation time information.

The transfer identification information is information to identify a type (transmission processing/reception processing) of the transfer processing. The virtual machine identification information is information to identify the virtual machine 22 as a target of the transfer processing. The network interface identification information is information to identify a network interface to be used for the transfer processing in the virtual machine 22. The traffic class information is information to identify a traffic class of a frame.

The descriptor ring used in the transfer processing can be specified based on the transfer identification information, the virtual machine identification information, the network interface identification information, and the traffic class information described above. Incidentally, the virtual machine identification information, the network interface identification information, and the traffic class information may be information held in another format as long as being the information with which the descriptor ring used in the frame data transfer can be specified.

The presentation time information is information indicating a presentation time included in a frame of audio video transport protocol (AVTP). The AVTP is defined by IEEE 1722. When no presentation time is included in a frame, information indicating that there is no valid presentation time is held in the presentation time information.

Returning to FIG. 2, the determination unit 49 determines whether to notify of the above-described completion notification based on the notification control information stored in the notification control information storage unit 47, the current time acquired from the current time storage unit 48, and the scheduling information acquired from the configuration unit 46 when receiving the frame transmission/reception information from the generation unit 45.

FIG. 7A is a view illustrating an example of the notification control information for transmission according to the first embodiment. FIG. 7B is a view illustrating an example of the notification control information for reception according to the first embodiment. The description of the notification control information for reception is similar to the description of the notification control information for transmission, and thus, the following description will be given by exemplifying the notification control information for transmission.

The notification control information for transmission according to the first embodiment includes a transmission source virtual machine, a network interface, a traffic class, a notification suppression value, and a current value.

The transmission source virtual machine indicates the virtual machine 22 that transmits a frame. The network interface indicates a network interface that transmits the frame. The traffic class indicates a traffic class of the frame. The descriptor ring used in the transmission process can be specified based on the transmission source virtual machine, the network interface, and the traffic class.

The notification suppression value includes the number of frames to aggregate and a timer value (ns).

The number of frames to aggregate indicates the number of frames whose notifications are aggregated. For example, when the number of frames to aggregate is four, notification of transmission completion notification of the four frames is suppressed until the transmission of the four frames is completed. When one is set as the number of frames to aggregate, notification of the completion notification is immediately made without being suppressed. In addition, zero is a special value, and the control based on the number of frames is not performed when zero is set as the number of frames to aggregate. When only the control based on the timer value is performed, zero is set as the number of frames to aggregate.

The timer value indicates a timer value to delay the notification. For example, when the timer value is 7000000 ns, notification of the transmission completion notification is suppressed until 7000000 ns has elapsed since the frame transmission is completed. Zero is a special value, and the control based on the timer value is not performed when the timer value is set to zero. When only the control based on the number of frames to aggregate is performed, zero is set as the timer value.

Incidentally, the operation in the case where both the number of frames to aggregate and the timer value are set may be arbitrary. When both the number of frames to aggregate and the timer value are set in the first embodiment, the setting of the number of frames to aggregate is preferentially applied. Specifically, even when the notification is delayed according to the timer value, the completion notification is notified if the number of frames for which transmission has been completed has reached the number of frames to aggregate.

The current value includes a notification suppression state, the number of remaining frames, and a remaining timer value (ns). The current value is used to store a current state. The notification suppression state indicates whether notification is suppressed. In the example of FIG. 7A, a case where the notification suppression state is zero indicates that the notification is not suppressed, and a case where the notification suppression information is one indicates that the notification is suppressed. The number of remaining frames indicates the number of frames required until performing notification. When a frame is transmitted in a state where the number of remaining frames is one, the completion notification is transmitted. The remaining timer value indicates a remaining time until notifying of the completion notification.

The current value is initialized by setting all values to zero at the time of initial setting.

Meanwhile, a method of setting the notification suppression value may be arbitrary. The notification suppression value may be set in advance by the application 24 using traffic, for example. In addition, some of the notification suppression values may be dynamically adjusted, for example. Incidentally, it is preferable to perform setting so as to aggregate notification (interrupt) for traffic with a low priority such as best effort, and not to aggregate notification (interrupt) for traffic with a high priority and a high real-time property. For example, it may be set such that an interrupt set as Express in a frame preemption table defined by IEEE 802.1Qbu, for example, is not aggregated.

In addition, it is described that there is setting for all the descriptor rings in the example of FIG. 7A. However, it is sufficient if there is an entry of the notification control information corresponding to the amount of the descriptor ring for which the notification suppression control is executed.

Incidentally, the specific description of the notification suppression control using the above-described notification control information is similar to the reception processing, and thus, will be described later in the description of the reception processing.

Returning to FIG. 2, when the determination unit 49 determines to notify of the completion notification, the notification unit 50 notifies the network interface unit 25 to be notified of the completion notification. For example, the notification unit 50 writes one to a DONE bit of a status of a descriptor for which data transfer has been completed to update the status to a processing completion state, and notifies of the completion notification by asserting an interrupt using the MSI-K. Whether the network interface unit 25 operates by being triggered by an interrupt or operates with polling varies depending on each of the virtual machines 22. When the interrupt is not used, the interrupt may be prevented from being generated using a function such as an interrupt mask.

When the network interface unit 25 is triggered by the interrupt, the corresponding descriptor ring is obtained from an interrupt number. In this case, the network interface unit 25 confirms a DONE bit and an error bit included in a status of the descriptor that has instructed data transfer. A case where the DONE bit is one indicates that processing has been completed. A case where the error bit is one indicates that an error has occurred in processing.

When the network interface unit 25 performs the polling operation, the network interface unit 25 periodically confirms whether the status (state information) of the descriptor that has instructed the data transfer is updated. The transmission for the descriptor whose status has been updated has already been completed. Thus, the buffer control unit 253 releases a buffer area storing a frame specified from the information included in the descriptor. Accordingly, it is possible to reuse this descriptor for the frame transmission control.

Example of Reception Processing

Next, the reception processing will be described returning to FIG. 4. When receiving a frame, the buffer control unit 253 of the network interface unit 25 allocates, in advance, a buffer area capable of storing a maximum length of the frame from a free area of the frame storage unit 252. Further, the buffer control unit 253 sets a head address of the buffer area allocated in advance as a transfer destination address of a descriptor. When setting the transfer destination address of the descriptor, the buffer control unit 253 sets a length included in the descriptor to zero and also sets an error bit and a DONE bit included in a status of the descriptor to zero.

The buffer control unit 253 performs the above-described processing with respect to all descriptors of all descriptor rings used for reception and updates a value of Tail. Further, the buffer control unit 253 sets all the descriptors of all the descriptor rings used for reception in a state of being owned by HW (that is, the network interface controller 4).

When the network interface controller 4 receives a frame from the network 200, the physical layer processor 41 executes reception processing of a physical layer of Ethernet (registered trademark). Next, the data link layer processor 42 executes reception processing of a data link layer of Ethernet (registered trademark). Processing on a MAC sublayer and processing on an LLC sublayer are executed in the processing of the data link layer. In addition, the data link layer processor 42 executes processing defined by the IEEE 802.1 TSN standard and if there is no abnormality in the received frame, the data link layer processor 42 inputs the frame to the classifying unit 43. When receiving the frame from the data link layer processor 42, the classifying unit 43 executes classifying processing of the frame.

FIG. 8 is a view for describing an example of the classifying processing according to the first embodiment. First of all, the classifying unit 43 classifies the frame according to a transmission destination MAC address included in the received frame.

In the example of FIG. 8, the frame is classified to the network interface unit 25a of the first virtual machine 22a when the transmission destination MAC address is AA-AA-AA-AA-AA-AA. The frame is classified to the network interface unit 25b of the second virtual machine 22b when the transmission destination MAC address is BB-BB-BB-BB-BB-BB. The frame is classified to the network interface unit 25c of the third virtual machine 22c when the transmission destination MAC address is CC-CC-CC-CC-CC-CC.

Incidentally, the MAC address is different for each of the network interfaces even when a plurality of network interfaces is used in the single virtual machine 22. Thus, the classifying unit 43 can classify frames using the transmission destination MAC address.

Next, the classifying unit 43 further classifies frames according to a traffic class. There is a priority code point (PCP) field indicating a priority in a VLAN tag of a frame. The classifying unit 43 class frames using, for example, a traffic class table indicating correspondence between the PCP and the traffic class.

FIG. 9 is a view illustrating an example of the traffic class table according to the first embodiment. The traffic class table as illustrated in FIG. 9 is defined in the TSN standard. The classifying unit 43 can associate the priority (PCP) with the traffic class by referring to the traffic class table. The classifying unit 43 uses the traffic class table to convert a PCP value of a frame into a traffic class and further classifies the frame according to the traffic class.

Returning to FIG. 2, the transfer unit 44 transfers the frame to the virtual machine 22 using a descriptor ring corresponding to the traffic class. Specifically, the transfer unit 44 first acquires a transfer destination address from a descriptor at a position of Head of the corresponding descriptor ring stored in the descriptor storage unit 254 by DMA. The transfer unit 44 transfers the frame to this transfer destination address, and writes a length of the frame to the length included in the descriptor when the transfer is ended.

In addition, the generation unit 45 generates the above-described frame transmission/reception information when the transfer of the frame by the transfer unit 44 is completed and inputs the frame transmission/reception information to the determination unit 49. This frame transmission/reception information is similar to that of the above-described transmission processing. However, the transfer identification information included in the frame transmission/reception information includes information indicating the reception processing.

Example of Determination Processing

Figure 10:
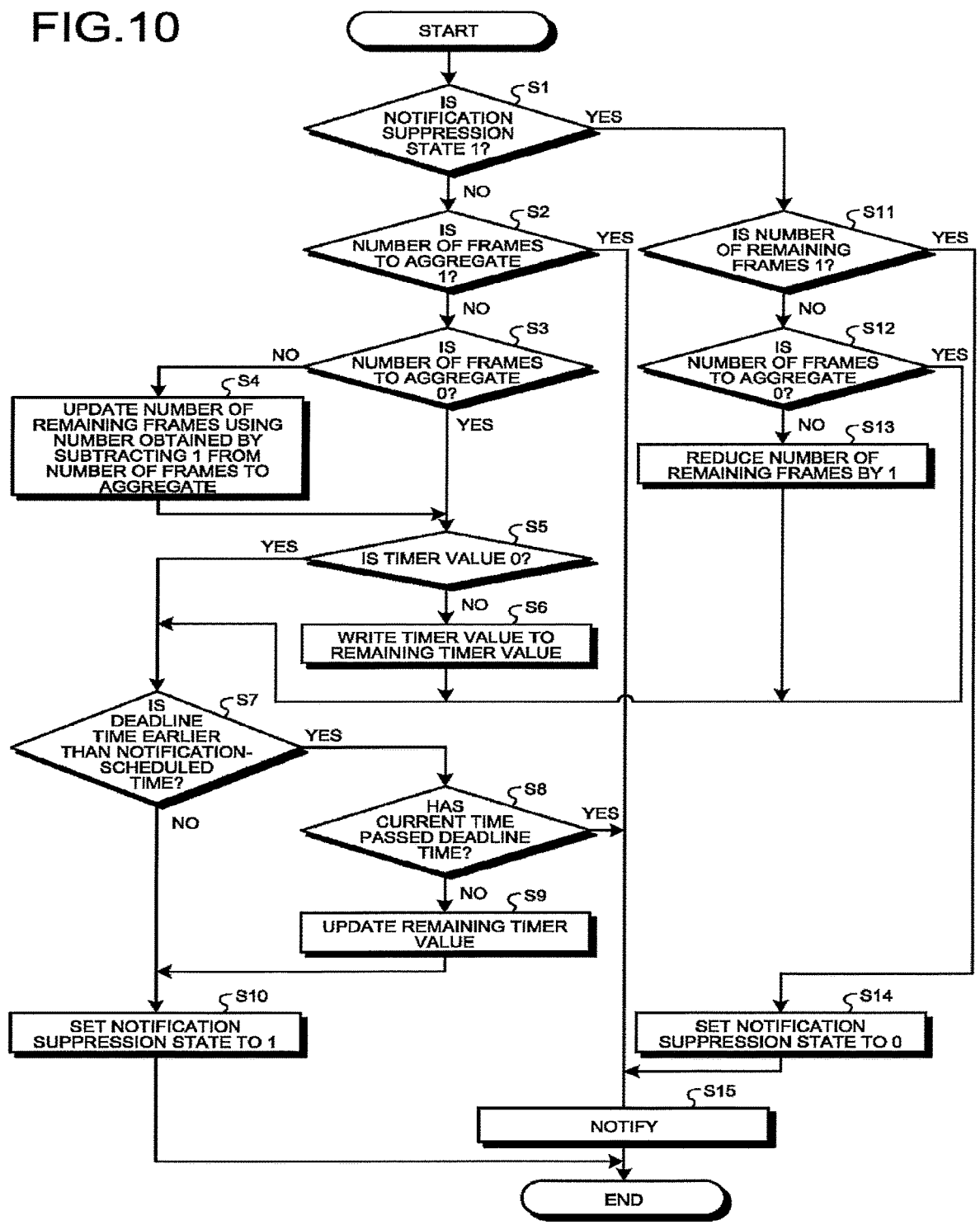
FIG. 10 is a flowchart illustrating an example of determination processing according to the first embodiment.

FIG. 10 is a flowchart illustrating an example of determination processing according to the first embodiment. First all, the determination unit 49 specifies a descriptor ring used in the transfer processing when receiving frame transmission/reception information from the generation unit 45 based on virtual machine identification information, network interface identification information, and traffic class information included in the frame transmission/reception information. Further, the determination unit 49 determines whether a notification suppression state of the descriptor ring used in the transfer processing is one (Step S1).

When the notification suppression state is one (Step S1, Yes), the determination unit 49 determines whether the number of remaining frames is one (Step S11).

When the remaining frame number is one (Step S11, Yes), the determination unit 49 sets the notification suppression state to zero (Step S14) and instructs the notification unit 50 to notify of the completion notification (Step S15).

When the number of remaining frames is not one (Step S11, No), the determination unit 49 determines whether the number of frames to aggregate is zero (Step S12). When the number of frames to aggregate is zero (Step S12, Yes), the process proceeds to Step S7. When the number of frames to aggregate is not zero (Step S12, No), the determination unit 49 reduces the number of remaining frames by one (Step S13) and proceeds to the process of Step S1.

When the notification suppression state is not one (Step S1, No), the determination unit 49 determines whether the number of frames to aggregate is one (Step S2).

When the number of frames to aggregate is one (Step S2, Yes), the determination unit 49 instructs the notification unit 50 to notify of the completion notification (Step S15).

When the number of frames to aggregate is not one (Step S2, No), the determination unit 49 determines whether the number of frames to aggregate is zero (Step S3). When the number of frames to aggregate is zero (Step 33, Yes), the process proceeds to Step S5. When the number of frames to aggregate is not zero (Step S3, No), the determination unit 49 updates the number of remaining frames with the number obtained by subtracting one from the number of frames to aggregate (Step S4).

Next, the determination unit 49 determines whether a timer value is zero (Step S5). When the timer value is zero (Step S5, Yes), the process proceeds to Step S7. When the timer value is not zero (Step S5, No), the determination unit 49 starts timer processing by writing the timer value to remaining timer value (Step S6) and proceeds to the process of Step S7.

Next, the determination unit 49 determines whether a deadline time is earlier than a notification-scheduled time according to the timer (Step S7). The deadline time indicates a notification deadline of the completion notification. Specifically, when presentation time information, scheduling information, and the like are available, the determination unit 49 determines whether a remaining time until the deadline time calculated based on the presentation time information, the scheduling information, and the like is equal to or smaller than a threshold. For example, the presentation time information is included in the AVTP frame, and thus, the presentation time is included in the frame transmission/reception information. In this case, the determination unit 49 calculates the deadline time by comparing a current time and a presentation time.

Here, an example of a method of calculating a deadline time will be described with reference to FIGS. 11 and 12.

Figure 11:
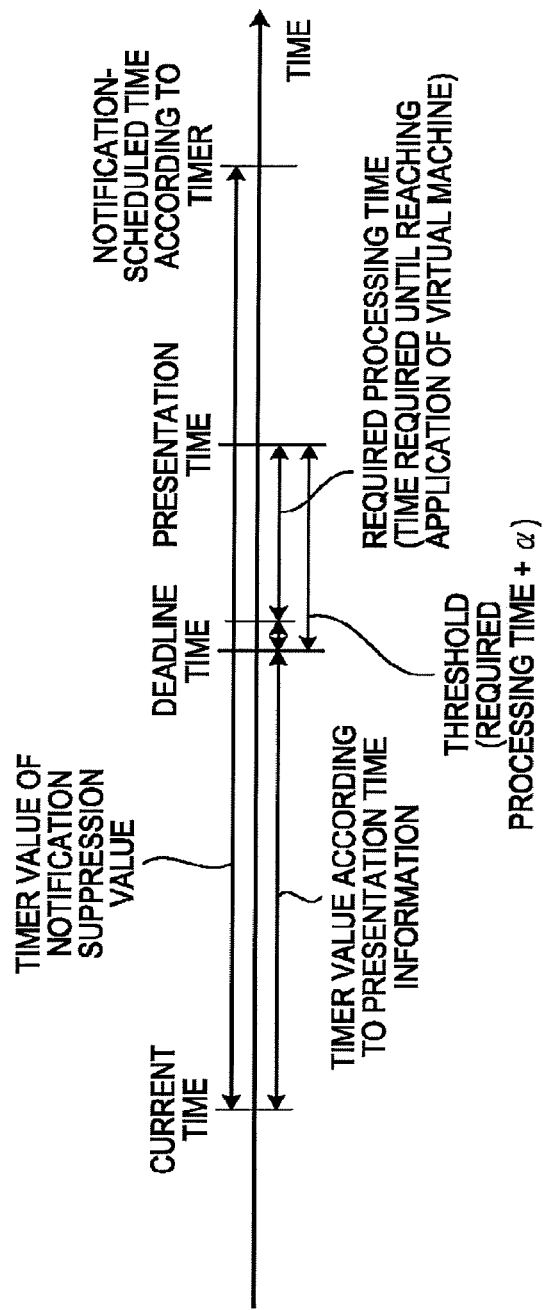
FIG. 11 is a view for describing Example 1 of a method of calculating a deadline time according to the first embodiment.

FIG. 11 is a view for describing Example 1 of the method of calculating a deadline time according to the first embodiment. When the completion notification is notified by the timer processing using a timer value, the notification is performed at a notification-scheduled time according to the timer. The determination unit 49 calculates a deadline time by subtracting a threshold from a presentation time. The threshold is, for example, a value obtained by adding $\alpha$ to a required processing time. The required processing time is a time required until data (a frame) reaches the application 24 of the transmission destination virtual machine 22 from transmission of the notification by the network interface controller 4.

The required processing time may be determined, for example, by an experiment in advance. $\alpha$ is used to absorb fluctuations in processing time. This $\alpha$ is also determined, for example, by an experiment in advance.

When there is no presentation time information (when a frame is not AVTP, or the like), the determination unit 49 sets a notification-scheduled time according to the timer to a deadline time. The determination unit 49 calculates a time from a current time to the deadline time as a timer value based on the presentation time information.

Figure 12:
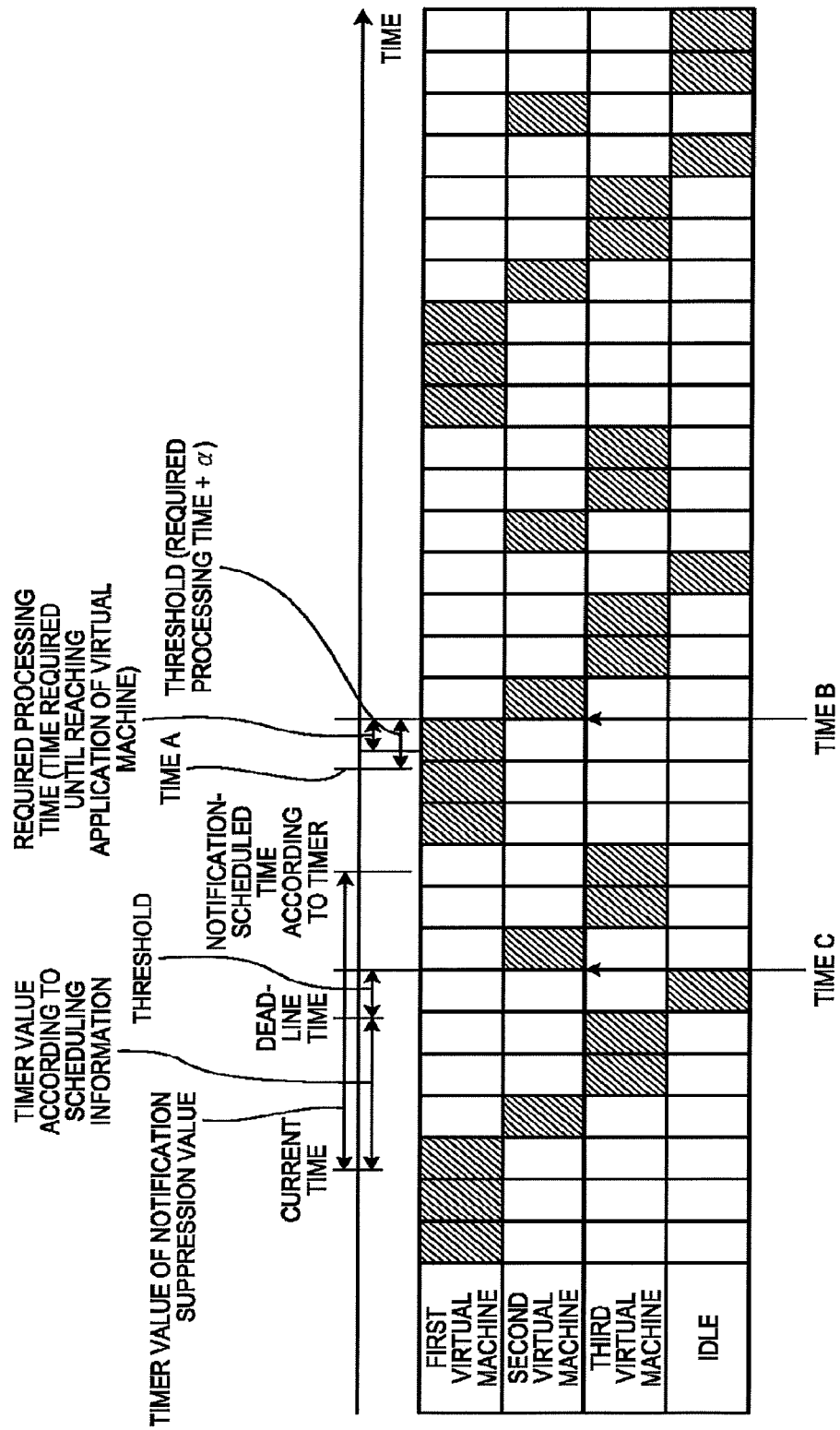
FIG. 12 is a view for describing Example 2 of the method of calculating a deadline time according to the first embodiment.

FIG. 12 is a view for describing Example 2 of the method of calculating a deadline time according to the first embodiment. The determination unit 49 calculates a deadline time based on scheduling information when the scheduling information can be referred to. Specifically, first of all, the determination unit 49 refers to the scheduling information to calculate a time B at which the virtual machine 22 (the first virtual machine 22a in the example of FIG. 12) transmitting and receiving a frame first after the notification-scheduled time according to the timer is turned into an execution state. Next, the determination unit 49 calculates a time A obtained by subtracting a threshold, obtained by adding a required processing time and the above-described $\alpha$, from the time B. Next, the determination unit 49 calculates a difference between the time A and the notification-scheduled time according to the timer. Next, when the difference between the time A and the notification-scheduled time according to the timer is larger than $\beta$, the determination unit 49 sets the deadline time using the scheduling information as a value obtained by subtracting the threshold from a time C at which the virtual machine 22 transmitting and receiving a frame last before the notification-scheduled time according to the timer is turned into the state of being executed.

When the scheduling information is not available, the determination unit 49 sets the notification-scheduled time according to the timer as the deadline time.

A time from a current time to the deadline time is calculated as a timer value based on the scheduling information.

Incidentally, $\alpha$ and $\beta$ described above may be set using a delay parameter of stream reservation protocol (SRP) of TSN. In addition, $\alpha$ and $\beta$ described above may be calculated based on communication requirements of the application 24 calculated in advance.

Returning to FIG. 10, when the deadline time calculated based on the above-described presentation time information and scheduling information, and the like is not earlier than the notification-scheduled time according to the timer (Step S7, No), the determination unit 49 sets a notification suppression state to one (Step S10) and ends the process.

When the deadline time calculated based on the above-described presentation time information and scheduling information, and the like is earlier than the notification-scheduled time according to the timer (Step S7, Yes), the determination unit 49 determines whether a current time has passed the deadline time (Step S8). When the current time has passed the deadline time (Step S8, Yes), the determination unit 49 immediately instructs the notification unit 50 to notify of the completion notification (Step S15).

When current time has not passed the deadline time (Step S8, No), the determination unit 49 updates a remaining timer value (Step S9), sets the notification suppression state to one (Step S10), and ends the process. Specifically, the determination unit 49 updates the remaining timer value with a smaller value between the timer value based on the presentation time information and the timer value based on the scheduling information. That is, the determination unit 49 updates an expiration time of the timer based on the timer value to an earlier deadline time between the deadline time calculated based on the presentation time information and the deadline time calculated based on the scheduling information.

Figure 13:
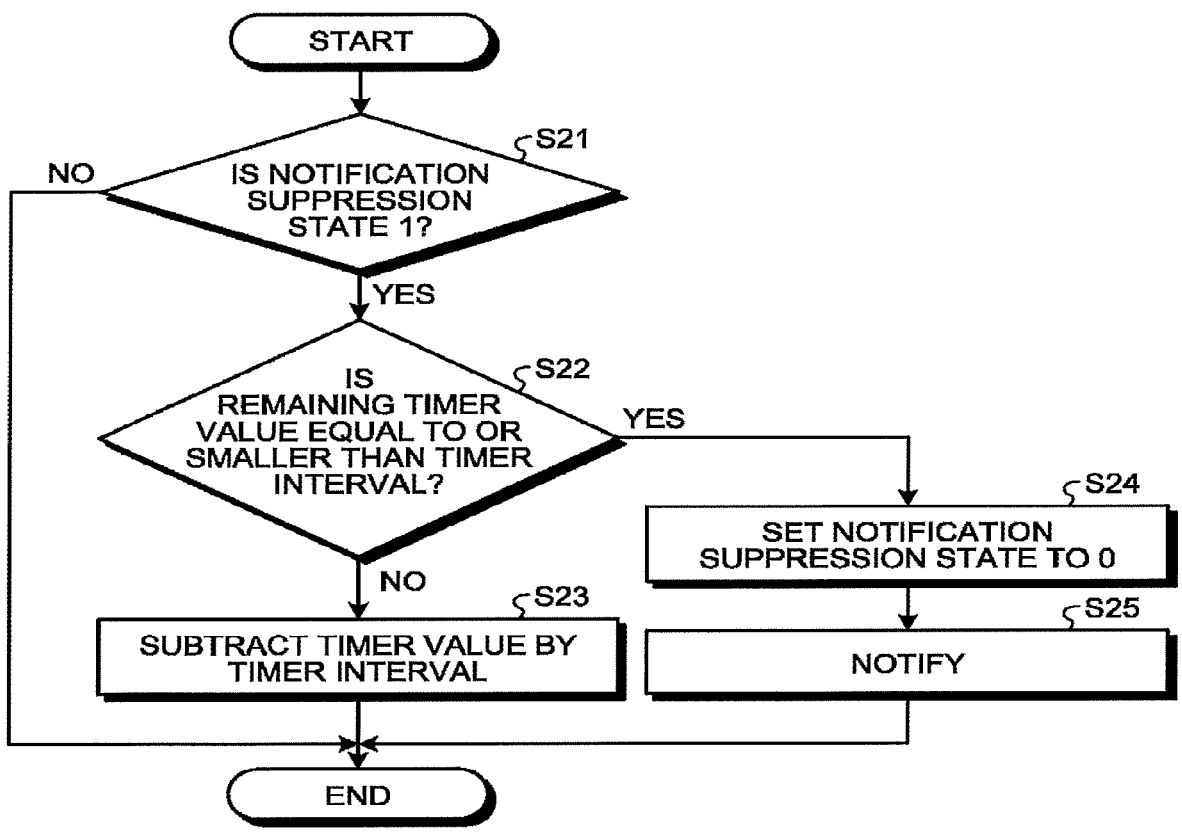
FIG. 13 is a flowchart illustrating an example of timer processing according to the first embodiment.

FIG. 13 is a flowchart illustrating an example of the timer processing according to the first embodiment. The timer processing using the determination unit 49 is performed at regular intervals, for example, 10 us. First of all, the determination unit 49 accesses each entry of notification control information, and determines whether a notification suppression state is one (Step S21). When the notification suppression state is not one (Step S21, No), the process is ended (proceeds to processing of the next entry).

When the notification suppression state is one (Step S21, Yes), the determination unit 49 determines whether a remaining timer value is equal to or smaller than a timer interval (Step S22). When the remaining timer value is equal to or smaller than the timer interval (Step S22, Yes), the determination unit 49 sets the notification suppression state to zero (Step S24), instructs the notification unit 50 to notify of the completion notification (Step S25), and ends the processing of this entry (shifts to processing of the next entry). When the remaining timer value is larger than the timer interval (Step S22, No), the determination unit 49 subtracts the timer value by the timer interval (Step S23), and ends the processing of this entry (shifts to processing of the next entry).

When the determination unit 49 determines to notify of the completion notification, the notification unit 50 notifies the network interface unit 25 of the virtual machine 22 to be notified of the completion notification indicating that the frame reception processing has been completed. For example, the notification unit 50 writes one to a DONE bit of a status of a descriptor for which data transfer has been completed to update the status to a processing completion state, and notifies of the completion notification by asserting an interrupt using the MSI-X. The buffer control unit 253 confirms the status of the descriptor by the interrupt or polling in the same manner as in the case of transmission processing. When the DONE bit included in the status is one, the buffer control unit 253 instructs the transfer unit 251 of the network interface unit 25 to transfer a frame. When receiving the transfer instruction from the buffer control unit 253, the transfer unit 251 copies data from the frame storage unit 252 to the buffer of the application 24. The buffer control unit 253 clears the error bit and the DONE bit included in the status of the descriptor for which copy has been completed to zero and updates a value of Tail. As a result, the descriptor for which copy has been completed is owned by HW, that is, the network interface controller 4 again, and used for reception of the frame.

As described above, the determination unit 49 uses the notification control information set according to the priority of the frame to determine whether to notify of the completion notification indicating the completion of processing of the frame in the communication device 100 according to the first embodiment. Further, when it is determined to notify of the completion notification, the notification unit 50 notifies of the completion notification. Specifically, the communication device 100 according to the first embodiment suppresses the transmission of the completion notification for each traffic class, for example, with the above-described configuration.

It is possible to alleviate a processing load on the host processor 2 while guaranteeing the real-time property of communication according to the communication device 100 of the first embodiment.

Incidentally, the description has been given by exemplifying the case of the communication device 100 including the determination unit 49 and the notification unit 50 in the above-described first embodiment. However, a mode of a device including the determination unit 49 and the notification unit 50 may be arbitrary. For example, the same effect as that of the above-described first embodiment can be obtained by a notification control device including the determination unit 49 and the notification unit 50 described above. In addition, the same effect as that of the above-described first embodiment can be obtained by a device including the notification control device.

Second Embodiment

Next, a second embodiment will be described. The same description as in the first embodiment will be omitted, and a different portion from the first embodiment will be described in the description of the second embodiment.

Example of Functional Configuration

Figure 14:
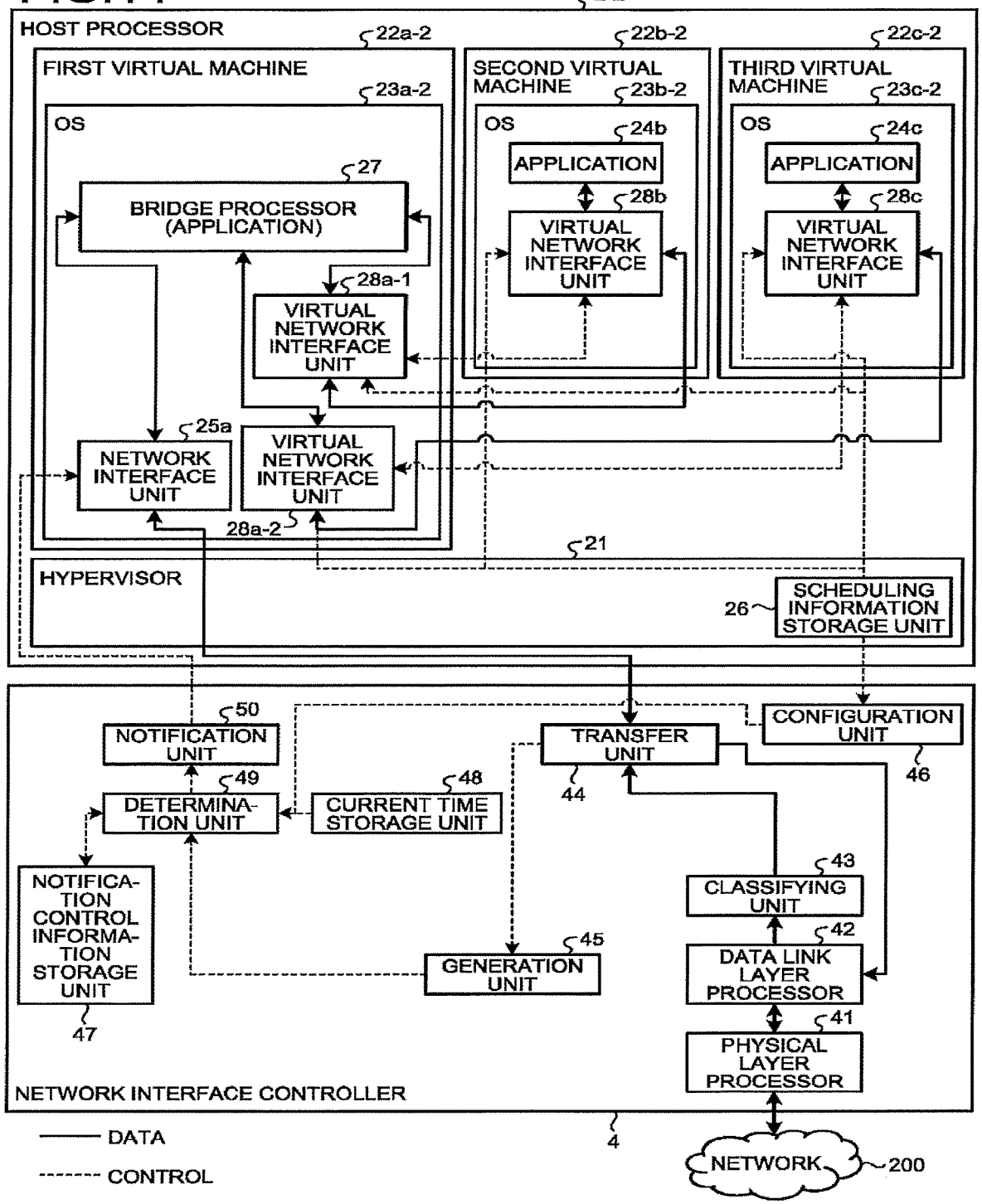
FIG. 14 is a diagram illustrating an example of a functional configuration of a main part of a communication device according to a second embodiment.

FIG. 14 is a diagram illustrating an example of a functional configuration of a main part of a communication device 100 according to the second embodiment. A network interface controller 4 of the second embodiment is similar to the network interface controller 4 of the first embodiment. The second embodiment is different from the first embodiment in terms that a second virtual machine 22b-2 and a third virtual machine 22c-2 operating on a host processor 2-2 perform communication via a bridge processor 27 of a first virtual machine 22a-2, that is, a software switch.

The host processor 2-2 includes a hypervisor 21, the first virtual machine 22a-2, the second virtual machine 22b-2, the third virtual machine 22c-2, OSs 23a-2 to 23c-2, applications 24b and 24c, a network interface unit 25a, a scheduling information storage unit 26, the bridge processor (application) 27, a virtual network interface unit 28a-1, a virtual network interface unit 28a-2, a virtual network interface unit 28b, and a virtual network interface unit 28c.

Hereinafter, the OSs 23a-2 to 23c-2 will be simply referred to as OSs 23-2 when not distinguished from each other. Similarly, the virtual network interface unit 28a-1, the virtual network interface unit 28a-2, the virtual network interface unit 28b, and the virtual network interface unit 28c will be simply referred to as virtual network interface units 28 when not distinguished from each other.

The bridge processor 27 transfers a frame among the first virtual machine 22a-2 to the third virtual machine 22c-2. In addition, the bridge processor 27 transfers a frame between the first virtual machine 23a-2 and the network interface controller 4.

The virtual network interface unit 28a-1 and the virtual network interface unit 28b transfer a frame between the first virtual machine 22a-2 and the second virtual machine 22b-2.

The virtual network interface unit 28a-2 and the virtual network interface unit 28c transfer a frame between the first virtual machine 22a-2 and the third virtual machine 22c-2.

The network interface controller 4 according to the second embodiment includes a physical layer processor 41, a data link layer processor 42, an classifying unit 43, a transfer unit 44, a generation unit 45, a configuration unit 46, a notification control information storage unit 47, a current time storage unit 48, a determination unit 49, and a notification unit 50. Since the network interface controller 4 of the second embodiment is similar to the network interface controller 4 of the first embodiment, the description thereof will be omitted.

Figure 15:
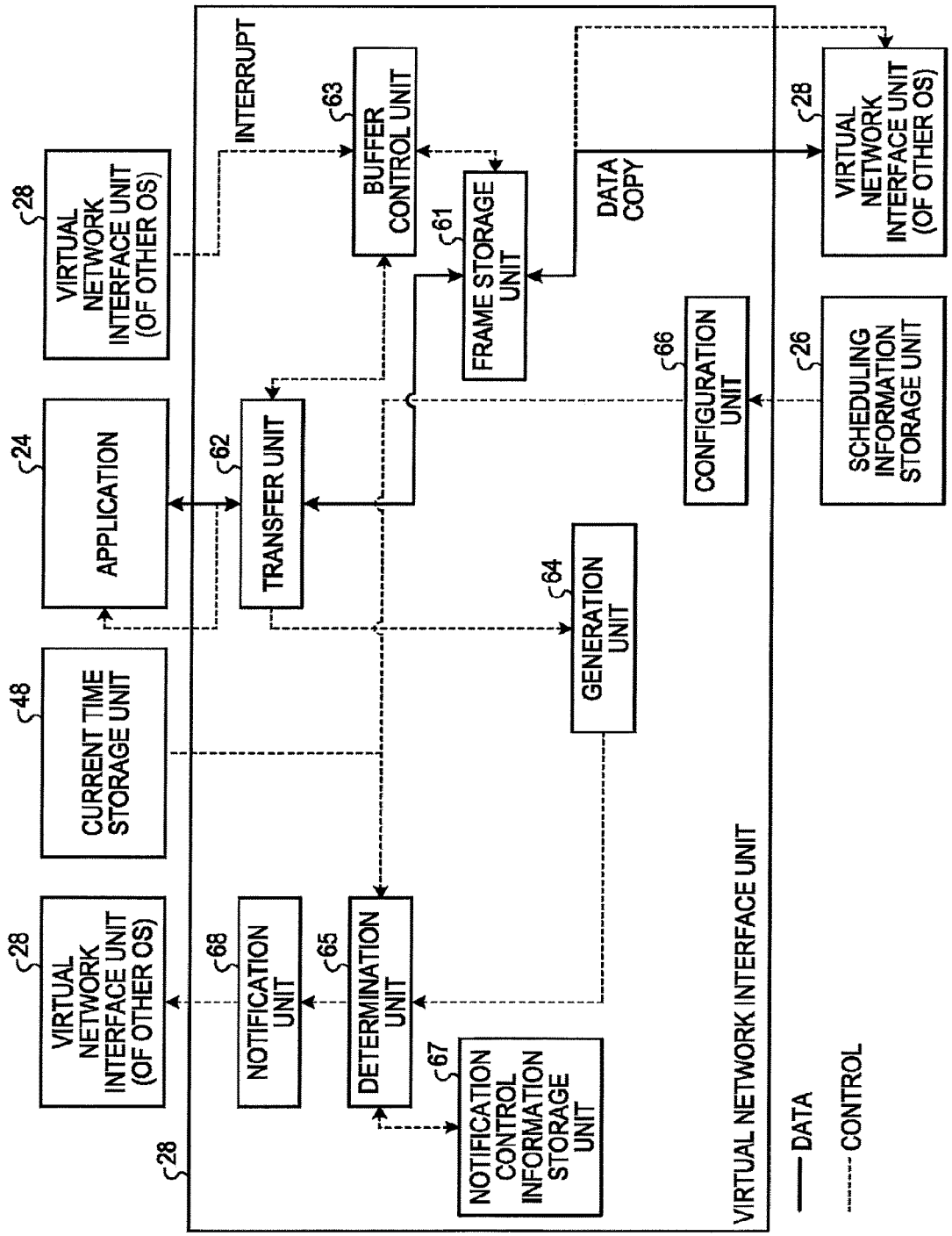
FIG. 15 is a diagram illustrating an example of a functional configuration of a virtual network interface unit according to the second embodiment.

FIG. 15 is a diagram illustrating an example of a functional configuration of the virtual network interface unit 28 according to the second embodiment. The virtual network interface unit 28 according to the second embodiment includes a frame storage unit 61, a transfer unit 62, a buffer control unit 63, a generation unit 64, a determination unit 65, a configuration unit 66, a notification control information storage unit 67, and a notification unit 68.

Since the frame storage unit 61 is similar to the above-described frame storage unit 252, the description thereof will be omitted.

Since the transfer unit 62 is similar to the above-described transfer unit 251, the description thereof will be omitted.

Since the buffer control unit 63 is similar to the above-described buffer control unit 253, the description thereof will be omitted. As described above, the buffer control unit 63 may operate by being triggered by an interrupt or operate with polling.

Since the generation unit 64 is similar to the above-described generation unit 45, the description thereof will be omitted.

Since the determination unit 65 is similar to the above-described determination unit 49, the description thereof will be omitted.

Since the configuration unit 66 is similar to the above-described configuration unit 46, the description thereof will be omitted.

Since the notification control information storage unit 67 is similar to the above-described notification control information storage unit 47, the description thereof will be omitted.

Since the notification unit 68 is similar to the above-described notification unit 50, the description thereof will be omitted.

Determination processing by the determination unit 65 of the virtual network interface unit 28 of the second embodiment is similar to the determination processing by the determination unit 49 of the network interface controller 4 of the first embodiment. Incidentally, it is possible to use a timer provided by the OS 23-2 or the like as a timer used for timer processing.

It is possible to obtain the same effect as that of the communication device 100 of the first embodiment according to the communication device 100 of the second embodiment. That is, it is possible to alleviate a processing load on the host processor 2-2 while guaranteeing a real-time property of communication.

Modification of Second Embodiment

Next, a modification of the second embodiment will be described. The same description as in the second embodiment will be omitted, and a different portion from the second embodiment will be described in the description of the modification of the second embodiment.

Figure 16:
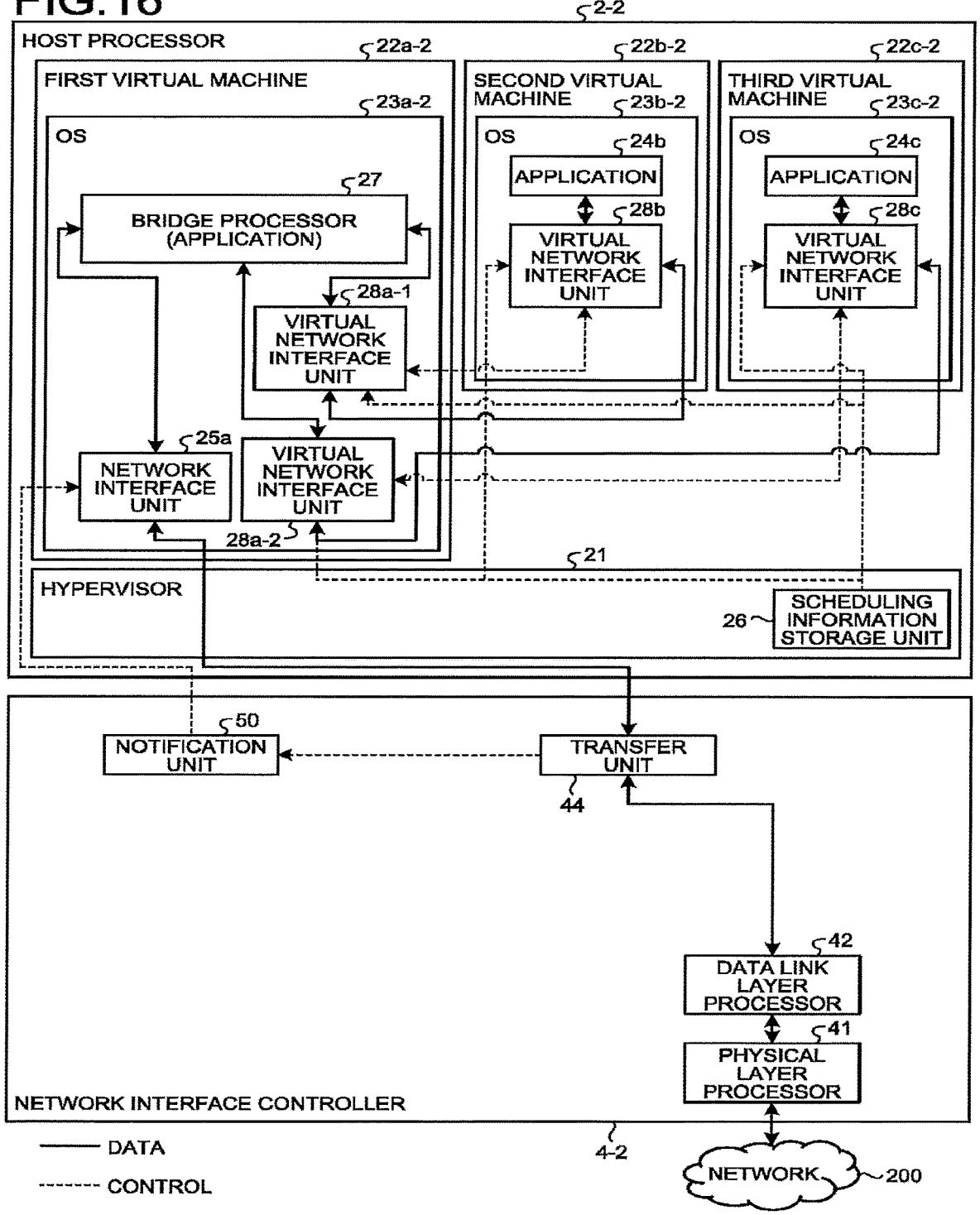
FIG. 16 is a diagram illustrating an example of a functional configuration of a main part of a communication device according to a modification of the second embodiment.

FIG. 16 is a diagram illustrating an example of a functional configuration of a main part of a communication device 100 according to the modification of the second embodiment. In the modification of the second embodiment, a configuration of a network interface controller 4-2 is different from the configuration of the network interface controller 4 of the second embodiment.

A host processor 2-2 includes a hypervisor 21, a first virtual machine 22a-2, a second virtual machine 22b-2, a third virtual machine 22c-2, OSs 23a-2 to 23c-2, applications 24b and 24c, a network interface unit 25a, a scheduling information storage unit 26, a bridge processor (application) 27, a virtual network interface unit 28a-1, a virtual network interface unit 28a-2, a virtual network interface unit 28b, and a virtual network interface unit 28c.

Since the host processor 2-2 of the modification of the second embodiment is similar to the host processor 2-2 of the second embodiment, the description thereof will be omitted.

The network interface controller 4-2 of the modification of the second embodiment includes a physical layer processor 41, a data link layer processor 42, a transfer unit 44, and a notification unit 50.

Since the physical layer processor 41, the data link layer processor 42, the transfer unit 44, and the notification unit 50 of the modification of the second embodiment are similar to the physical layer processor 41, the data link layer processor 42, the transfer unit 44, and the notification unit 50 of the second embodiment, the description thereof will be omitted.

The above-described determination processing which is executed in the network interface controller 4 of the second embodiment is not executed in the modification of the second embodiment. That is, the above-described determination processing is executed only by each of the virtual network interface units 28 of the host processor 2-2 in the modification of the second embodiment.

It is possible to obtain the same effect as that of the communication device 100 of the first embodiment according to the communication device 100 of the modification of the second embodiment. That is, it is possible to alleviate a processing load on the host processor 2-2 while guaranteeing a real-time property of communication.

Incidentally, the communication devices 100 according to the first and second embodiments described above can also be implemented, for example, by using a general-purpose computer device as basic hardware. That is, it is possible to implement a function, which can be implemented by a program, among the functional configurations of the communication devices 100 according to the first and second embodiments described above by causing a processor mounted on a computer device to execute the program. At this time, the communication device 100 may be implemented by, for example, installing the program in the computer device in advance. In addition, for example, the communication device 100 may be implemented by appropriately installing the program stored in a storage medium such as a CD-ROM in the computer device. In addition, for example, the communication device 100 may be implemented by appropriately installing the program distributed via a network in the computer device.

Although several embodiments have been described, the above-described embodiments are given as mere examples, and have no intention to limit the scope of the embodiments. These novel embodiments can be carried out in other various modes, and various omissions, replacements, and changes can be made within a scope not departing from a gist of the embodiments. These embodiments and modifications thereof are included in the scope and gist of the embodiments, and are also included in the embodiments described in the claims and a range equivalent thereto.

For example, the example in which the completion notification is suppressed in the entire traffic class has been described in the above description of the embodiments, but it may be set such that the completion notification is suppressed only for best-effort traffic and the completion notification is not suppressed for real-time traffic.

In addition, for example, the different descriptor ring is used for each traffic class in the above description of the embodiments, but it may be configured such that the completion notification is suppressed for each PCP value by dividing the descriptor ring by the PCP value without using the traffic class table.

For example, the case where the above-described completion notification is suppressed by using the different descriptor ring provided for each traffic class has been described in the above description of the embodiments, but the completion notification may be suppressed by using a descriptor ring provided for each AVTP stream. In addition, the completion notification may be suppressed by using a specific descriptor ring assigned to a specific stream, for example, in a case where resources are insufficient.

In addition, it may be configured such that for example, when gPTP defined by IEEE 802.1AS and a time-synchronization frame defined by IEEE 1588 are received, completion notification indicating that reception processing of the frame has been completed may be instantly notified. Specifically, it may be configured such that when datagram with an Ethernet (registered trademark) type value (Ethertype) of 0x88F7, a UDP port number of 319, and a UDP port number of 320 is received, the datagram is instantly notified.

In addition, for example, the case where the descriptor storage unit 254 is the ring buffer has been described in the above-described embodiments, but the descriptor storage unit 254 may be implemented using a queue (FIFO: First In First Out).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A notification control device, comprising:
a memory; and
one or more processors configured to:
determine, using stored notification control information set according to a priority of a frame, whether to suppress or delay, or whether to not suppress and not delay an interrupt indicating completion of processing of the frame, and
notify a host processor of the interrupt when not suppressing and not delaying the interrupt, wherein
the notification control information includes a notification suppression state indicating a notification-suppressed state or a notification-unsuppressed state for each priority of the frame and current value information indicating a current value with respect to a notification threshold that is set according to the priority of the frame,
the current value information indicates a difference between a number of frames to aggregate and a number of frames having a same priority for which the processing is completed,
the notification threshold is a number of frames to aggregate that is set for each priority,
the one or more processors is further configured to set, with the processing of the frame as a trigger, the notification suppression state based on the current value information and determine to notify the host processor of the interrupt when the notification suppression state is indicative of the notification-unsuppressed state, and
the processing of the frame is at least one of transmission processing and reception processing of the frame.

2. The device according to claim 1, wherein
the notification control information is set to a transmission queue obtained by dividing for each priority and to a reception queue obtained by dividing for each priority.

3. The device according to claim 1, wherein
the one or more processors is further configured to determine to suppress or delay the interrupt when the current value information indicates that the difference does not reach a predetermined value.

4. The device according to claim 1, wherein
the notification threshold is a timer value that is set for each priority,
the current value information is a remaining timer value indicating a difference between the timer value and a time elapsed since the processing of the frame having a same priority is completed, and
the one or more processors is further configured to determine to suppress or delay the interrupt when the remaining timer value does not reach a predetermined value.

5. The device according to claim 3, wherein
the one or more processors is further configured to calculate a deadline time indicating a notification deadline of the interrupt and determine to notify of the interrupt, which is not yet notified, when a current time coincides with the deadline time, even when the current value information indicates that the difference does not reach the predetermined value.

6. The device according to claim 4, wherein
the one or more processors is further configured to calculate a deadline time indicating a notification deadline of the interrupt and update an expiration time of a timer based on the timer value to the deadline time when the deadline time is earlier than the expiration time of the timer based on the timer value.

7. The device according to claim 5, wherein
the frame includes a presentation time, and
the one or more processors is further configured to calculate the deadline time based on the presentation time.

8. The device according to claim 5, wherein
one or more virtual machines operate in the host processor,
the one or more processors is further configured to notify any of the one or more virtual machines of the interrupt, and calculate the deadline time based on scheduling information indicating a schedule of an execution time assigned to each of the one or more virtual machines.

9. The device according to claim 1, wherein the priority is based on a traffic class of the frame.

10. A notification control method, comprising:
determining, using stored notification control information set according to a priority of a frame, whether to suppress or delay, or whether to not suppress and not delay an interrupt indicating completion of processing of the frame; and
notifying a host processor of the interrupt when not suppressing and not delaying the interrupt, wherein
the notification control information includes a notification suppression state indicating a notification-suppressed state or a notification-unsuppressed state for each priority of the frame and current value information indicating a current value with respect to a notification threshold that is set according to the priority of the frame,
the current value information indicates a difference between a number of frames to aggregate and a number of frames having a same priority for which the processing is completed,
the notification threshold is a number of frames to aggregate that is set for each priority,
the notification suppression state is set with the processing of the frame as a trigger and based on the current value information,
the notifying the host processor of the interrupt is determined when the notification suppression state is indicative of the notification-unsuppressed state, and
the processing of the frame is at least one of transmission processing and reception processing of the frame.

11. A computer program product comprising a non-transitory computer readable medium including programmed instructions, the instructions, when executed by a computer, causing the computer to perform:
determining, using stored notification control information set according to a priority of a frame, whether to suppress or delay, or whether to not suppress and not delay an interrupt indicating completion of processing of the frame; and
notifying a host processor of the interrupt when not suppressing and not delaying the interrupt, wherein
the notification control information includes a notification suppression state indicating a notification-suppressed state or a notification-unsuppressed state for each priority of the frame and current value information indicating a current value with respect to a notification threshold that is set according to the priority of the frame,
the current value information indicates a difference between a number of frames to aggregate and a number of frames having a same priority for which the processing is completed,
the notification threshold is a number of frames to aggregate that is set for each priority,
the notification suppression state is set with the processing of the frame as a trigger and based on the current value information,
the notifying the host processor of the interrupt is determined when the notification suppression state is indicative of the notification-unsuppressed state, and
the processing of the frame is at least one of transmission processing and reception processing of the frame.

* * * * *